(12) United States Patent
Harima

(10) Patent No.: US 9,010,113 B2
(45) Date of Patent: Apr. 21, 2015

(54) CONTROL APPARATUS OF AN INTERNAL COMBUSTION ENGINE

(75) Inventor: Kenji Harima, Numazu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 512 days.

(21) Appl. No.: 13/383,788

(22) PCT Filed: Sep. 24, 2009

(86) PCT No.: PCT/JP2009/066477
§ 371 (c)(1),
(2), (4) Date: Jan. 12, 2012

(87) PCT Pub. No.: WO2011/036740
PCT Pub. Date: Mar. 31, 2011

(65) Prior Publication Data
US 2012/0111000 A1 May 10, 2012

(51) Int. Cl.
*F02B 33/44* (2006.01)
*F02M 25/07* (2006.01)
*F02D 41/00* (2006.01)
(Continued)

(52) U.S. Cl.
CPC ........ *F02M 25/0702* (2013.01); *F02D 41/0055* (2013.01); *F02D 41/1497* (2013.01); *F02D 41/221* (2013.01); *F02M 25/0707* (2013.01);
(Continued)

(58) Field of Classification Search
CPC .......... F02M 25/0702; F02M 25/0707; F02M 25/0709; F02M 25/0754; F02M 25/0756; F02M 25/0777; F02M 25/0713; F02D 41/0055; F02D 41/1497; F02D 41/221; F02D 2200/0406; Y02T 10/121

USPC ........ 60/605.2; 701/108; 123/568.16, 568.21, 123/568.22
IPC ........................................................ F02M 25/07
See application file for complete search history.

(56) References Cited

U.S. PATENT DOCUMENTS 4,255,789 A * 3/1981 Hartford et al. ............... 701/108
4,541,398 A * 9/1985 Kishi ........................ 123/568.16
(Continued)

FOREIGN PATENT DOCUMENTS

DE 19532129 A1 3/1997
JP 10-047120 A 2/1998
(Continued)

OTHER PUBLICATIONS

International Search Report mailed Oct. 27, 2009 of PCT/P2009/066477.

*Primary Examiner* — Thai Ba Trieu
(74) *Attorney, Agent, or Firm* — Kenyon & Kenyon LLP

(57) ABSTRACT

A control apparatus judges an abnormality of an internal combustion engine. The engine has an external EGR apparatus, including an exhaust gas recirculation passage that connects an exhaust passage with an intake passage, and an EGR valve that can increase and decrease an outside EGR flow quantity that flows back into the intake passage from said exhaust passage through the exhaust gas recirculation passage by being adjusted in its opening angle. The control apparatus acquires an output value of the engine and determines occurrence of abnormality in the external EGR apparatus according to a predetermined criterion based on a difference between an output of the engine in which a first EGR flow quantity is flown back and an output of the engine in which a second EGR flow quantity is flown back.

8 Claims, 9 Drawing Sheets

(51) Int. Cl.
*F02D 41/14* (2006.01)
*F02D 41/22* (2006.01)

(52) U.S. Cl.
CPC ....... *F02M 25/0709* (2013.01); *F02M 25/0713* (2013.01); *Y02T 10/121* (2013.01)

(56) References Cited

U.S. PATENT DOCUMENTS

| | | | | |
|---|---|---|---|---|
| 4,594,669 | A | * | 6/1986 | Hosaka ........................ 701/103 |
| 5,152,273 | A | * | 10/1992 | Ohuchi .................... 123/568.16 |
| 5,154,156 | A | * | 10/1992 | Ohuchi .................... 123/568.16 |
| 5,241,937 | A | * | 9/1993 | Kanehiro et al. ........ 123/406.27 |
| 5,359,975 | A | * | 11/1994 | Katashiba et al. ....... 123/568.26 |
| 5,368,005 | A | * | 11/1994 | Kako ....................... 123/568.16 |
| 5,385,130 | A | | 1/1995 | Hornewer et al. |
| 5,632,257 | A | * | 5/1997 | Machida et al. ........ 123/568.16 |
| 5,916,130 | A | * | 6/1999 | Nakae et al. ............ 123/568.16 |
| 6,390,077 | B1 | * | 5/2002 | Simpson et al. ........ 123/568.16 |
| 6,405,701 | B1 | | 6/2002 | Masberg et al. |
| 7,100,586 | B2 | * | 9/2006 | Matsumoto ............. 123/568.16 |
| 7,107,761 | B2 | * | 9/2006 | Fukuma et al. .......... 123/568.11 |
| 7,836,693 | B2 | * | 11/2010 | Fujita et al. .................. 60/605.2 |
| 7,895,838 | B2 | * | 3/2011 | Ono .............................. 60/605.2 |
| 8,108,128 | B2 | * | 1/2012 | Zurlo et al. .................... 701/108 |
| 8,316,828 | B2 | * | 11/2012 | Whitney et al. .......... 123/568.16 |
| 2007/0246028 | A1 | * | 10/2007 | Fujita et al. .............. 123/568.12 |
| 2008/0127636 | A1 | * | 6/2008 | Dahlgren ................. 123/568.11 |
| 2008/0295514 | A1 | * | 12/2008 | Ono .............................. 60/605.2 |
| 2010/0037873 | A1 | | 2/2010 | Jung et al. |
| 2010/0186726 | A1 | * | 7/2010 | Takagi ..................... 123/568.16 |

FOREIGN PATENT DOCUMENTS

| | | |
|---|---|---|
| JP | 2001-107811 A | 4/2001 |
| JP | 2001-152842 A | 6/2001 |
| JP | 2002-004901 A | 1/2002 |
| JP | 2002-256982 A | 9/2002 |
| JP | 2003-120349 A | 4/2003 |
| JP | 2003-148182 A | 5/2003 |
| JP | 2007-315371 A | 12/2007 |
| JP | 2009-121381 A | 6/2009 |
| JP | 2009-191701 A | 8/2009 |
| WO | 2007141083 A1 | 12/2007 |

* cited by examiner

CONTROL APPARATUS OF AN INTERNAL COMBUSTION ENGINE

CROSS-REFERENCE TO RELATED APPLICATIONS

This is a 371 national phase application of PCT/JP2009/066477 filed 24 Sep. 2009, the contents of which are incorporated herein by reference.

TECHNICAL FIELD

The present invention relates to an control apparatus of an internal combustion engine, which is preferable for controlling an external EGR apparatus attached to an internal combustion engine.

BACKGROUND ART

Conventionally, a control apparatus of an internal combustion engine that can detect a cylinder in which increased torque fluctuation due to overmuch inside EGR arises is disclosed in, for example, under listed patent document 1. More particularly, according to the invention disclosed in patent document 1, a cylinder in which overmuch inside EGR arises can be detected based on torque fluctuation of each individual cylinder and intake pressure, which varies according to an inside EGR quantity in each individual cylinder.

PRIOR ART DOCUMENTS

Patent Document

Patent Document 1: Japanese Patent Laid-Open No. 2003-148182

DISCLOSURE OF THE INVENTION

Problem to be Solved by the Invention

In the above mentioned patent documents 1, a judgment reference value is set based on a mean value of each torque fluctuation of cylinders. Thus, the judgment reference value becomes to be overlarge in a case where, for example, large torque fluctuation arises in all cylinders, resulting in that overmuch inside EGR quantity is not detected even though torque fluctuation that is problematic in drivability is produced.

The present invention has been made to solve the above mentioned problem. It is an object of the present invention to provide a control apparatus of an internal combustion engine that can surely judge that an abnormality has occurred when a problem in drivability arises.

Means for Solving the Problem

To achieve the above mentioned purpose, the first aspect of the present invention is a control apparatus of an internal combustion engine, comprising:
an external EGR apparatus, including
an exhaust gas recirculation passage that connects an exhaust passage and an intake passage of the internal combustion engine, and
an EGR valve that can increase and decrease an external EGR flow quantity that flows back into said intake passage from said exhaust passage through said exhaust gas recirculation passage by being adjusted its opening angle;
output value acquiring means that acquire an output value of the engine; and
EGR abnormality judgment means that judge occurrence of abnormality in said external EGR apparatus according to a predetermined criterion based on a difference between an output of the engine in which a first EGR flow quantity is flown back of and an output of the engine in which a second EGR flow quantity is flown back.

The second aspect of the present invention is the control apparatus of an internal combustion engine according to the first aspect of the present invention, wherein
said EGR abnormality judgment means comprise:
first calculating means for calculating, based on the value acquired by said output value acquiring means, a realistic value of the output fluctuation, which is the difference of the output values of the engine between when the first EGR flow quantity is flown back and when the second EGR flow quantity is flown back;
first memory means that store a standard value of said output fluctuation; and
second memory means that store a predetermined threshold value, and
said EGR abnormality judgment means judge the occurrence of abnormality in said external EGR apparatus based on a comparison result of said realistic value, said standard value, and said threshold value.

The third aspect of the present invention is the control apparatus of an internal combustion engine according to the second aspect of the present invention, wherein said EGR abnormality judgment means judge the occurrence of abnormality in said external EGR apparatus when an absolute value of the difference between said realistic value and said standard value is bigger than said threshold value.

The fourth aspect of the present invention is the control apparatus of an internal combustion engine according to the second aspect of the present invention, wherein said EGR abnormality judgment means judge that the external EGR flow quantity is overmuch when a value taken by subtracting said standard value from said realistic value is bigger than said threshold value.

The fifth aspect of the present invention is the control apparatus of an internal combustion engine according to the second aspect of the present invention, wherein said EGR abnormality judgment means judge that the external EGR flow quantity is insufficient when a value taken by subtracting said realistic value from said standard value is bigger than said threshold value.

The sixth aspect of the present invention is the control apparatus of an internal combustion engine according to the fourth aspect of the present invention, further comprising:
second calculating means for calculating a fluctuation of output of the engine under a condition in which the external EGR flow quantity is constant;
first judgment means for judging whether the fluctuation of output of the engine calculated by said second calculating means is smaller than said realistic value, at a time when an external EGR flow quantity equal to the smaller one of said first EGR flow quantity and said second EGR flow quantity is flown back; and
second judgment means for judging whether the fluctuation of output of the engine calculated by said second calculating means is larger than said threshold value, at a time when an external EGR flow quantity equal to the larger one of said first EGR flow quantity and said second EGR flow quantity is flown back;

wherein it is judged that said external EGR apparatus is out of order in a status in which the external EGR flow quantity is larger than a target value, when said EGR abnormality judgment means judge that the external EGR flow quantity is overmuch and both said first judgment means and said second judgment means make affirmative judgments.

The seventh aspect of the present invention is the control apparatus of an internal combustion engine according to the fifth aspect of the present invention, further comprising:

second calculating means to calculate fluctuation of output of the engine under a condition in which the external EGR flow quantity is constant; and first judgment means for judging whether the fluctuation of output of the engine calculated by said second calculating means is smaller than said realistic value, at a time when an external EGR flow quantity equal to the smaller one of said first EGR flow quantity and said second EGR flow quantity is flown back;

wherein it is judged that an abnormality has occurred at some portion other than said external EGR apparatus, when said EGR abnormality judgment means judge that the external EGR flow quantity is insufficient and said first judgment means make a negative judgment.

The eighth aspect of the present invention is the control apparatus of an internal combustion engine according to the seventh aspect of the present invention, further comprising, third judgment means for judging whether the fluctuation of output of the engine calculated by said second calculating means is larger than said standard value, at a time when an external EGR flow quantity equal to the larger one of said first EGR flow quantity and said second EGR flow quantity is flown back;

wherein it is judged that said external EGR apparatus is out of order in a status in which the external EGR flow quantity is smaller than a target value, when said EGR abnormality judgment means judge that the external EGR flow quantity is insufficient and both said first judgment means and said third judgment means make affirmative judgments.

The ninth aspect of the present invention is the control apparatus of an internal combustion engine according to any one of the first to eighth aspects of the present invention, further comprising:

a supercharger including a turbine and a compressor;
wherein said exhaust gas recirculation passage includes:
a high pressure exhaust gas recirculation passage that connects upstream side of the exhaust passage than said turbine and downstream side of the intake passage than said compressor; and a low pressure exhaust gas recirculation passage that connects downstream side of the exhaust passage than said turbine and upstream side of the intake passage than said compressor;

wherein said EGR valve includes:
a high pressure purpose EGR valve installed to said high pressure exhaust gas recirculation passage, being capable of increasing and decreasing the external EGR flow quantity that flows back into said intake passage from said exhaust passage by being adjusted its opening angle; and a low pressure purpose EGR valve installed to said low pressure exhaust gas recirculation passage, being capable of increasing and decreasing the external EGR flow quantity that flows back into said intake passage from said exhaust passage by being adjusted its opening angle;

wherein one of said first EGR flow quantity and said second EGR flow quantity is equal to an external EGR flow quantity produced when exhaust gas is flown back only through one of said high pressure exhaust gas recirculation passage and said low pressure exhaust gas recirculation passage, and the other is equal to an external EGR flow quantity produced when exhaust gas is flown back through both said high pressure exhaust gas recirculation passage and said low pressure exhaust gas recirculation passage.

Advantages of the Invention

According to the first, second or third aspect of the present invention, a judgment criterion for abnormality judgment can be set to an output fluctuation value that gives an influence to drivability. Thus, it is possible to judge an abnormality occurrence of the external EGR apparatus when the external EGR flow quantity varies so as to arises a problem in drivability.

According to the fourth aspect of the present invention, it is possible to judge whether the external EGR flow quantity is overmuch or not with regard to the abnormality occurring on the external EGR apparatus. From this judgment, the status of the external EGR flow quantity under a case in which an abnormality occurs on the external EGR apparatus can be detected.

According to the fifth aspect of the present invention, it is possible to judge whether the external EGR flow quantity is insufficient or not with regard to the abnormality occurring on the external EGR apparatus. From this judgment, the status of the external EGR flow quantity under a case in which an abnormality occurs on the external EGR apparatus can be detected.

According to the sixth aspect of the present invention, it is possible to judge an abnormality of the external EGR apparatus based on output fluctuation under a condition in which the external EGR flow quantity is constant. By means of executing the abnormality judgment of the external EGR apparatus through the different way from that of the first, second or third aspect of the invention, it is possible to warrant the judgment result of the first, second or third aspect of the invention, thereby preventing an erroneous judgment. As a result, accuracy of the abnormality judgment of the external EGR apparatus is improved.

According to the seventh aspect of the present invention, it is possible to judge an abnormality of the external EGR apparatus based on output fluctuation under a condition in which the external EGR flow quantity is constant. As a result, it is possible to prevent an erroneous judgment of the external EGR apparatus so as to improve the judgment accuracy. Further, it is possible to judge that an abnormality has occurred at some portion other than the external EGR apparatus when the external EGR flow quantity is judged to be insufficient.

According to the eighth aspect of the present invention, it is possible to judge an abnormality of the external EGR apparatus based on output fluctuation under a condition in which the external EGR flow quantity is constant. By means of executing the abnormality judgment of the external EGR apparatus through the different way from that of the first or second aspect of the invention, it is possible to warrant the judgment result of the first or second aspect of the invention, thereby preventing an erroneous judgment. As a result, accuracy of the abnormality judgment of the external EGR apparatus is improved.

According to the ninth aspect of the present invention, it is possible to determine in an internal combustion engine equipped with dual system of external EGR apparatus that which system of external EGR apparatus is suffered from an abnormality. As a result, it can effectively contribute to execution of countermeasure for the abnormality.

BRIEF DESCRIPTION OF THE DRAWINGS

FIG. 1 is a drawing showing a system configuration of an internal combustion engine which a control apparatus according to the present invention is applied to;

BEST MODE FOR CARRYING OUT THE INVENTION

First Embodiment

Configuration of Driving System

Figure 1:
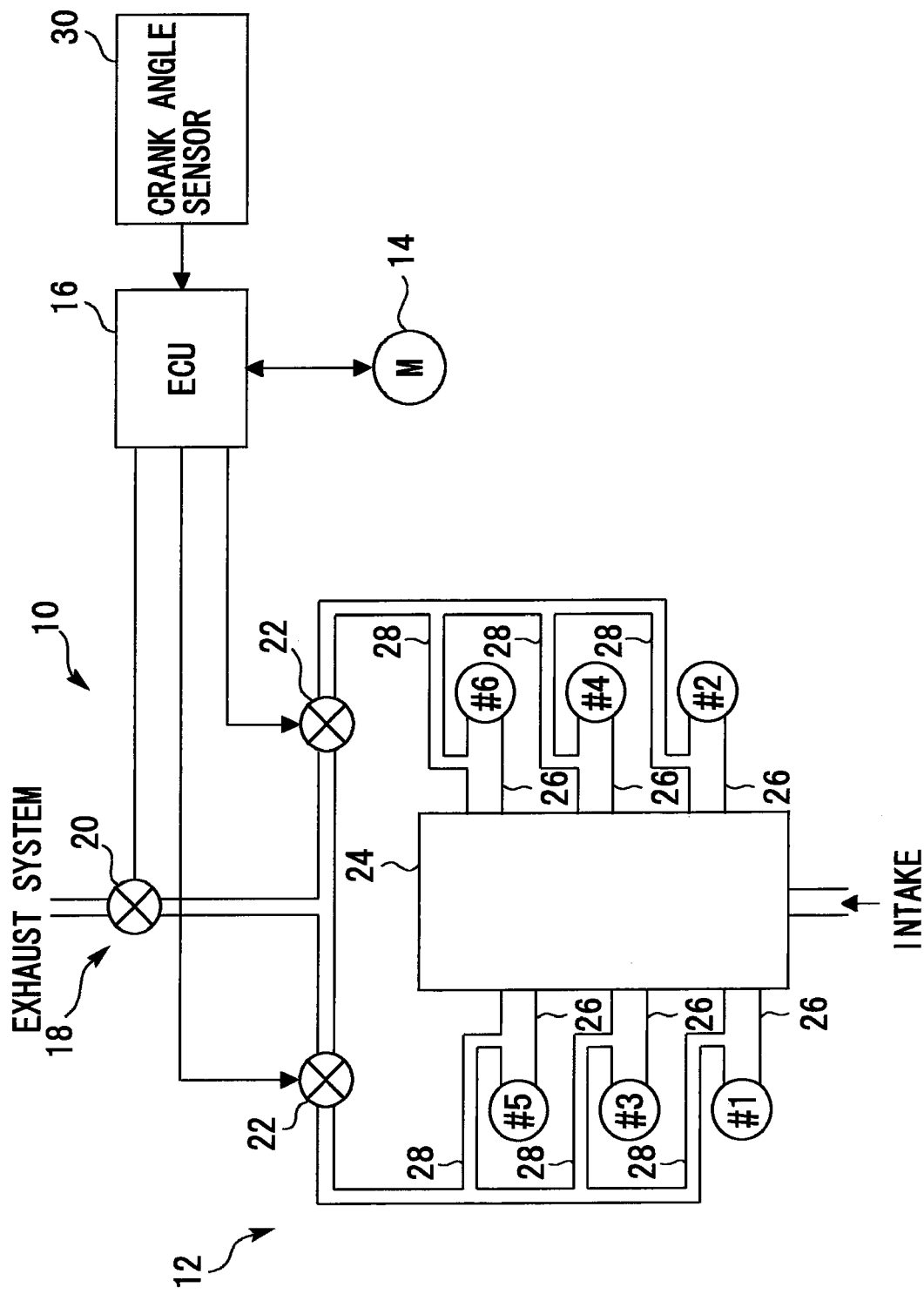

FIG. 1 is a drawing showing outline of structure of a driving system 10 of a hybrid vehicle which the present invention is applied to. This driving system 10 is provided with an internal combustion engine 12 and a vehicle driving purpose motor (referred to "motor" hereafter) 14 as power source of the vehicle. The driving system 10 activates both the internal combustion engine 12 and the motor 14, being capable of rotating driving wheels, illustration of which is omitted, by driving force of the both.

The driving system 10 of the present embodiment is controlled by an ECU (Electronic Control Unit) 16. The ECU 16 controls in an integrated manner the entirety of the driving system 10 including the internal combustion engine 12, the motor 14 and so on.

[System Configuration of the Internal Combustion Engine]

The internal combustion engine 12 according to the present embodiment is a four stroke engines of V-six cylinders. The internal combustion engine 12 includes an external EGR apparatus 18 for making exhaust gas flow back into the intake passage from the exhaust passage. The external EGR apparatus 18 is provided with a common EGR valve 20 to regulate the total amount of the external EGR flow quantity. The external EGR apparatus 18 is also provided with bank EGR valves 22 to regulate the external EGR flow quantity differently in each individual bank. The external EGR apparatus 18 further includes delivery pipes 28 each of which is connected to an intake branch pipe 26, which extends from the surge tank 24, of each cylinder. In addition, the internal combustion engine 12 includes a crank angle sensor 30 that outputs a signal corresponding to rotation of the crank shaft which is not illustrated.

The crank angle sensor 30 is connected to the input side of the above-mentioned ECU 16. The output side of the ECU 16 is connected to actuators of the common EGR valve and the bank EGR valves 22.

[Concrete Procedure Steps of the Present Embodiment]

Figure 2:
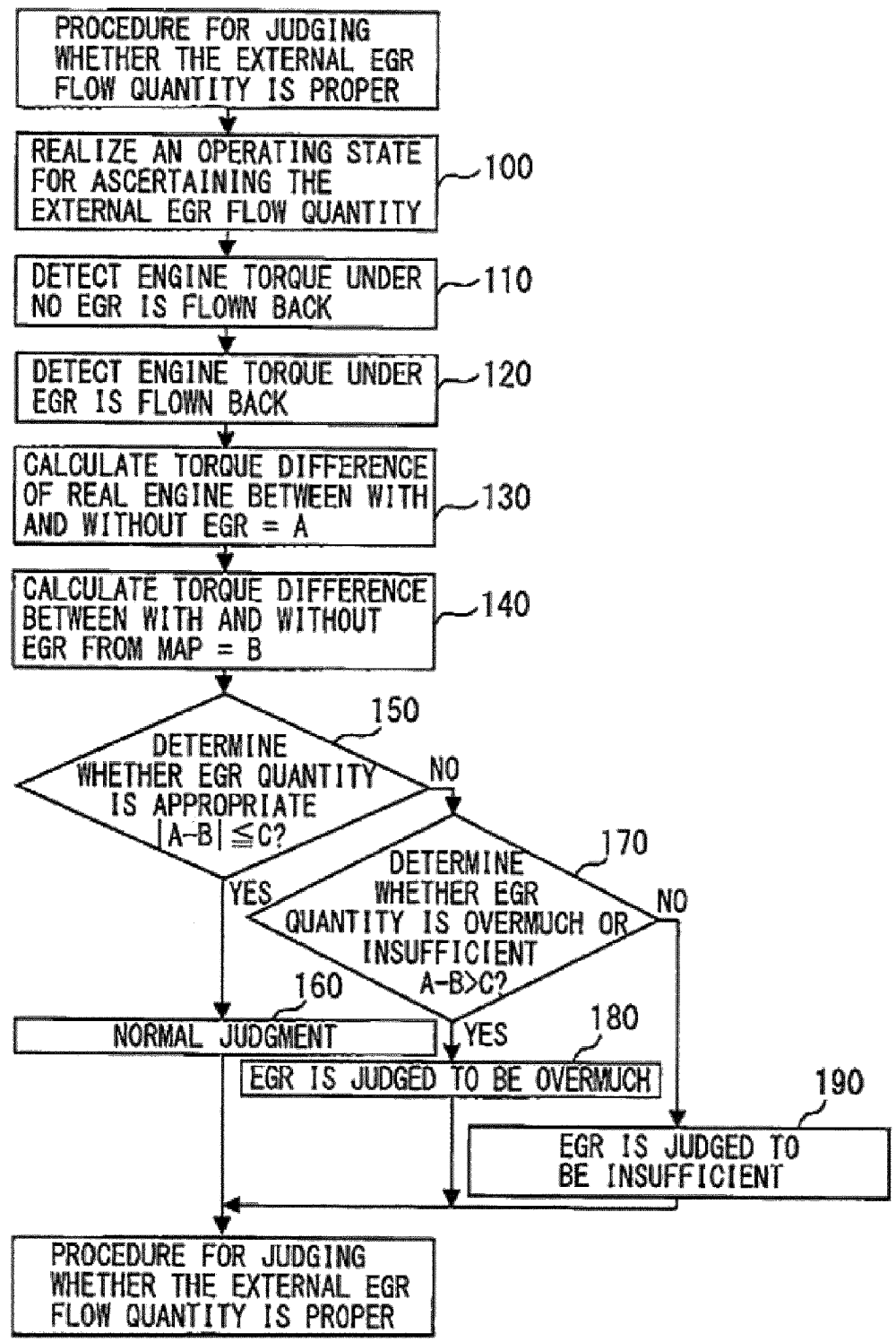
FIG. 2 is a flowchart showing steps for judging whether the external EGR flow quantity is proper according to an embodiment of the present invention.

FIG. 2 is a flowchart showing steps for judging whether the external EGR flow quantity is proper according to the present embodiment. According to the routine shown in FIG. 2, operating state for ascertaining the external EGR flow quantity is realized (step 100). More concretely, operating the motor 14 so that its driving power assists the fluctuation of the output required by the driving system, thereby the internal combustion engine 12 can be in a static state. According to this, the output value of the internal combustion engine 12 can be detected effectively in later described steps 110 and 120.

After the internal combustion engine 12 is brought into the static state as a result of the above mentioned step 100, output mean value of the internal combustion engine 12 in which exhaust gas is not flown back through the external EGR apparatus 18 is detected (step 110). More particularly, output values occurring at ignition timings of every one of cylinders are detected so as to calculate the mean value thereof as the output mean value. The output values occurring at ignition timings of every one of cylinders are calculated based on angular degree signals of the crank shaft detected by the crank angle sensor 30.

Then, output value of the internal combustion engine 12 in which predetermined quantity of exhaust gas is flown back through the external EGR apparatus 18 is detected (step 120). In this step, like the above described step 110, output values occurring at ignition timings of every one of cylinders are detected so as to calculate the mean value thereof as an output mean value.

Then, output difference of the real engine (referred to "actual measurement difference A" hereafter) between a case in which exhaust gas is not flown back through the external EGR apparatus 18 and a case in which predetermined quantity of exhaust gas is flown back is calculated (step 130). In other words, the difference of the output mean values of the internal combustion engine 12 detected by the above described steps 110 and 120 is calculated.

Further, output difference between a case in which exhaust gas is not flown back through the external EGR apparatus 18 and a case in which predetermined quantity of exhaust gas is flown back is calculated based on a map (step 140). The output difference obtained by this is referred to "standard difference B". In this embodiment, a map showing a relationship between standard difference B and exhaust gas quantity that is flown back through the external EGR apparatus 18 is stored in a ROM of the ECU 16. In step 140, the standard difference B of the output fluctuation value is determined by looking-up the map based on the exhaust gas quantity flown back through the external EGR apparatus 18.

Then, it is determined whether the external EGR flow quantity is appropriate (step 150). Concretely, the difference between the real measurement difference A calculated in the above described step 130 and the standard difference B determined in step 140 is calculated, so as to compare the calculated value with a predetermined threshold value C. The threshold value C is the maximum of the output difference allowable in view of drivability due to fluctuation of the external EGR flow quantity. The external EGR flow quantity is judged to be appropriate if the absolute value of the difference between the real measurement difference A and the standard difference B is judged to be equal to or smaller than the threshold value C as a result of step 150 (step 160).

It can be determined that the external EGR flow quantity is not appropriate if the absolute value of the difference between the real measurement difference A and the standard difference B is judged to be larger than the threshold value C as a result of step 150. According to the judgment like this, existence of abnormality in the external EGR apparatus 18 can be detected surely when the external EGR flow quantity changes in the extent by which a problem in drivability will occur. In this case, it is determined further whether the external EGR flow quantity is overmuch or insufficient compared with the appropriate quantity (step 170). More concretely, judgment is made to know whether the value obtained by subtracting the standard difference B from the real measurement difference A is larger than the threshold value C. The external EGR flow quantity is judged to be overmuch compared with the appropriate value when the value obtained by subtracting the standard difference B from the real measurement difference A is judged to be larger than the threshold value C as a result of step 170 (step 180). On the other hand, in a case where the judgment in step 170 is negative, that is, the value obtained by subtracting the real measurement difference A from the standard difference B is judged to be larger than C, the external EGR flow quantity is judged to be insufficient compared with the appropriate value (step 190).

Incidentally, when the judgment is made in the above described step 180 that the external EGR flow quantity is overmuch compared with the appropriate value, procedure for determining an abnormal portion of the external EGR apparatus 18 under an overmuch external EGR flow quantity is executed according to a later described flowchart. Similarly, when the judgment is made in the above described step 190 that the external EGR flow quantity is insufficient compared with the appropriate value, procedure for determining an abnormal portion of the external EGR apparatus 18 under an insufficient external EGR flow quantity is executed according to a later described flowchart.

Figure 3:
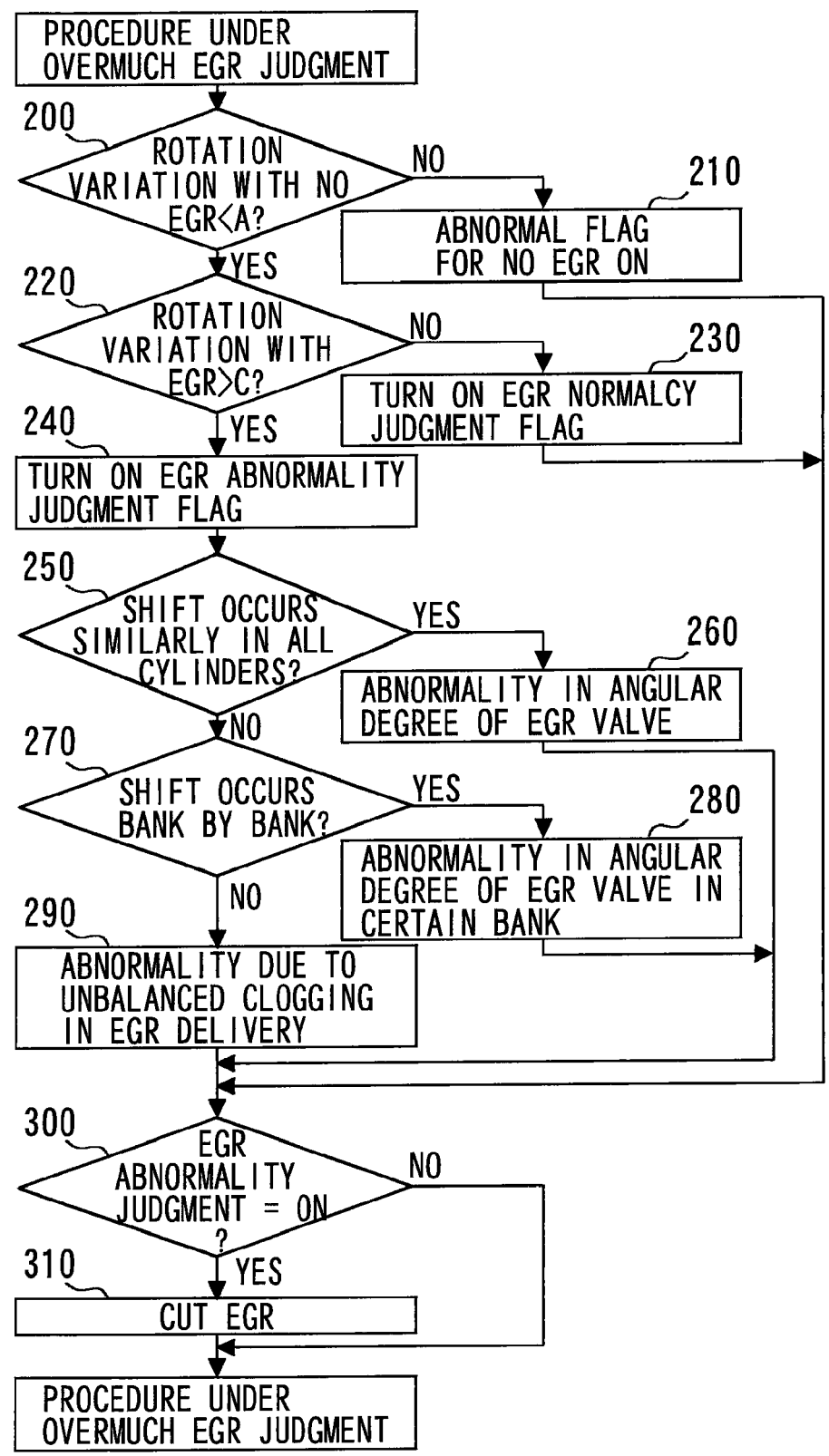
FIG. 3 is a flowchart showing steps executed when the external EGR flow quantity is overmuch for judging an abnormal place of the external EGR apparatus.

FIG. 3 is a flowchart showing steps executed when the external EGR flow quantity is overmuch for judging an abnormal place of the external EGR apparatus. According to the routine shown in FIG. 3, it is determined whether output fluctuation value of the internal combustion engine 12 in which exhaust gas is not flown back through the external EGR apparatus 18 is smaller than the above described real measurement difference A at first (step 200). Here, concretely, output fluctuation values (output fluctuations among every explosion) of every one of cylinders are calculated so as to determine whether the maximum value among the output fluctuation values is smaller than the real measurement difference A. For the calculation of the output fluctuation value of every one of cylinders, angular velocity of the crank shaft within a predetermined crank angle range which includes, for example, BTDC 60° is calculated at first. Further, angular velocity of the crank shaft within a predetermined crank angle including TDC is calculated. Then, based on those angular velocities, output value at a timing of explosion in the above discussed predetermined cylinder is calculated so as to calculate difference between it and the output value of the last explosion cycle as output fluctuation value of the above described predetermined cylinder. The real measurement difference A is an output difference that is detected to occur on the real machine of the internal combustion engine 12. Thus, judgment could be made that an abnormality was already occurred under a situation in which the external EGR flow quantity was zero, if a fluctuation equal to or greater than A were recognized under a condition in which exhaust gas was not flown back through the external EGR apparatus 18. The judgment in the present step 200 is executed about all cylinders, respectively. As a result, an abnormality flag for the status in which the external EGR flow quantity is zero is turned ON when the judgment of the present step 200 is denied on at least one cylinder (step 210).

On the other hand, next step 220 is executed when it is determined that the output fluctuation value of the internal combustion engine 12 under no exhaust gas flown back through the external EGR apparatus 18 is smaller than the above discussed real measurement difference A as for all cylinders.

When the judgment is affirmed in the above discussed step 200, then, it is judged whether output fluctuation value with predetermined quantity of exhaust gas being flown back through the external EGR apparatus 18 is larger than the above described threshold value C (step 220). Concretely, like the above mentioned step 200, output fluctuation values of every one of cylinders are calculated at first. As a result, when it is determined that the output fluctuation value is larger than the threshold value C at least in one cylinder, judgment is made that an abnormality has been arisen under a condition with the predetermined quantity of outside EGR for turning ON an external EGR apparatus abnormality flag (step 240). As stated above, the threshold value C is the maximum of the output difference allowable in view of drivability due to fluctuation of the external EGR flow quantity. According to such a judgment, therefore, it is possible to execute an abnormality judgment of the external EGR apparatus 18 on the basis of the drivability. On the other hand, when it is determined in step 220 that the output fluctuation value is equal to or smaller than the threshold value C at all cylinders, judgment is made that an abnormality has not been arisen on the external EGR apparatus 18 for turning ON an external EGR apparatus normalcy flag (step 230).

When the external EGR apparatus abnormality flag is turn ON in the above mentioned step 240, it is determined, then, whether the output fluctuation values of all cylinders of the internal combustion engine 12 have shifted similarly (step 250). Concretely, deviation Xi (i shows cylinder numbering) of the output fluctuation value calculated in the above mentioned step 220 for every cylinder is calculated at first. Then, mean value $\mu$ of the calculated deviations Xi of the output fluctuation value is calculated so as to calculate values by subtracting the mean value $\mu$ from every one of the deviations Xi. When the values calculated by subtracting the mean value $\mu$ from the deviations Xi are within a regulation range for all cylinders, judgment is made that the output fluctuation values of all cylinders of the internal combustion engine 12 have shifted similarly. Here, the judgment of step 250 is executed under a condition in which an assumption that the output fluctuation value was occurred due to an abnormality arising in the external EGR apparatus 18 is given. Accordingly, if the value calculated by subtracting the mean value $\mu$ from the deviation Xi is within the regulation range for all cylinders as described above, it can be determined that the output fluctuation values of all cylinders have shifted similarly.

When it is determined in step 250 that the output fluctuation values have shifted similarly in all cylinders of the internal combustion engine 12, judgment is made that an abnormality (for example, fixation of the valve by carbon deposit) occurs in the common outside EGR stem passage (for example, common EGR valve 20) which affects the exhaust gas flow quantity flowing back to all cylinders (step 260).

On the other hand, when judgment is made in step 250 that the output fluctuation values for all cylinders of the internal combustion engine 12 have not shifted similarly, it is, then, determined whether they have shifted bank by bank (step 270). Concretely, likely to the above described step 250, procedure for judging whether the value obtained by subtracting the mean value μ from the deviation Xi is within the regulation range or not is executed for every bank. For example, first cylinder #1, third cylinder #3, and fifth cylinder #5 are assumed to be a first bank, while second cylinder #2, fourth cylinder #4, and sixth cylinder #6 are assumed to be a second bank. As for the first bank, it is determined whether a value obtained by subtracting a mean value μ1 (μ1: mean value of deviation of the output fluctuation value of the first bank) from the deviation Xi (i=1, 3, 5) is within the regulation range. Similarly, as for the second bank, it is determined whether a value obtained by subtracting a mean value μ2 (μ2: mean value of deviation of the output fluctuation value of the second bank) from the deviation Xi (i=2, 4, 6) is within the regulation range. When judgment is made that the value obtained by subtracting the mean value μ from the deviation Xi is within the regulation range as for both the first bank and the second bank, it is determined that the output fluctuation values of the internal combustion engine 12 have shifted bank by bank. Here, the judgment of step 270 is executed under a condition in which an assumption that the output fluctuation values for all cylinders have not shifted similarly is given. Accordingly, if the value calculated by subtracting the mean value μ from the deviation Xi is judged to be within the regulation range for both the first bank and the second bank, it can be determined that the output fluctuation values have shifted bank by bank.

When judgment is made in step 270 that the output fluctuation values of the internal combustion engine 12 have shifted bank by bank, it is determined that an abnormality (for example, fixation of the valve by carbon deposit) occurs in the outside EGR stem passage provided to each bank (for example, bank EGR valve 22) (step 280).

On the other hand, when judgment is made in step 270 that the output fluctuation values of the internal combustion engine 12 have not shifted bank by bank, it can be determined that the output fluctuation values have shifted cylinder by cylinder. In this case, the ECU 16 judges that an abnormality arises in the delivery pipe 28 for each cylinder (step 290). For example, clogging up or the like of the delivery pipe 28 of a certain cylinder due to carbon deposit can be considered as the cause of this abnormality. In this case, it is likely that the external EGR flow quantity of the certain cylinder becomes insufficient while the external EGR flow quantity of other cylinders become increased.

Next, it is determined whether the external EGR apparatus abnormality flag (see step 240) becomes ON or not (step 300). When judgment is made as a result of step 300 that the external EGR apparatus abnormality flag is ON, the external EGR flow quantity flown back through the external EGR apparatus 18 is reduced (step 310). Concretely, it is decided to cut the external EGR flow quantity in this case according to the present embodiment. On the other hand, when judgment is made as a result of step 300 that the abnormality flag is not ON, this processing cycle is brought to the end.

Figure 4:
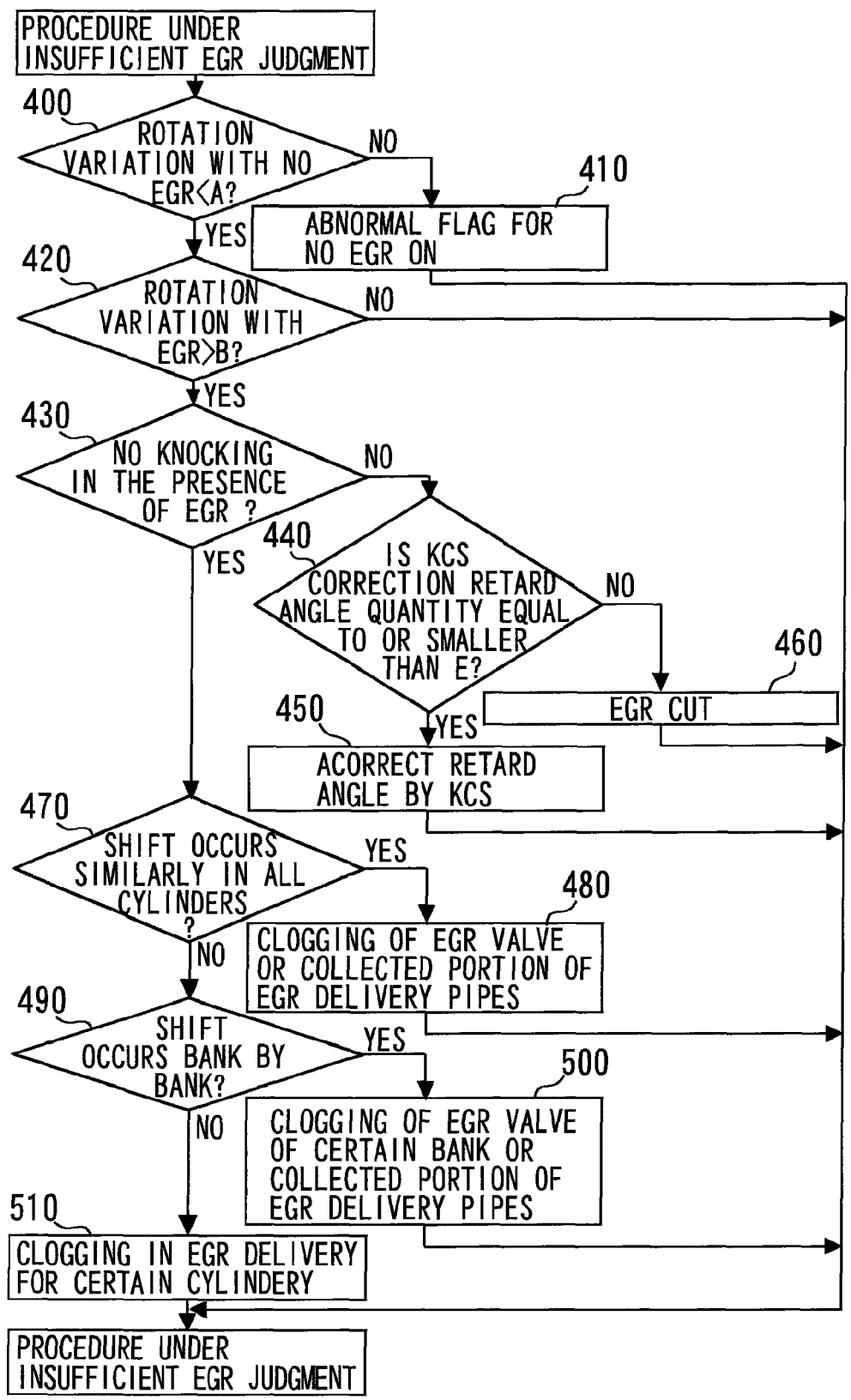
FIG. 4 is a flowchart showing steps executed when the external EGR flow quantity is insufficient for judging an abnormal place of the external EGR apparatus.

FIG. 4 is a flowchart showing steps executed when the external EGR flow quantity is insufficient for judging an abnormal place of the external EGR apparatus. According to the routine shown in FIG. 4, it is determined whether output fluctuation value of the internal combustion engine 12 in which exhaust gas is not flown back through the external EGR apparatus 18 is smaller than the above described real measurement difference A at first (step 400). Concretely, similar to the case of step 200 in FIG. 3, output fluctuation value of every cylinder is calculated so as to determine whether the maximum value among the output fluctuation values is smaller than the real measurement difference A.

Next, step 420 is executed when it is determined, as a result of above described step 400, that the output fluctuation value of the internal combustion engine 12 under no exhaust gas flown back through the external EGR apparatus 18 is smaller than the above discussed real measurement difference A. On the other hand, when the maximum value of the output fluctuation value is judged to be equal or larger than the real measurement difference A, an abnormality flag is turn ON based on a judgment that an abnormality must occur under a condition of zero external EGR flow quantity (step 410).

When the judgment is affirmed in the above discussed step 400, then, it is judged whether output fluctuation value of the internal combustion engine 12 with predetermined quantity of exhaust gas being flown back through the external EGR apparatus 18 is larger than the above described standard difference B (step 420). Concretely, like the above mentioned step 400, output fluctuation values of every one of cylinders are calculated at first. Then, calculated output fluctuation value for every cylinder is compared with the standard difference B. When the output fluctuation value is determined to be equal to or smaller than the standard difference B as for all cylinders, it can be judged that abnormal fluctuation exceeding a standard level arises in no cylinder. In this case, this processing cycle is brought to the end. On the other hand, when it is determined that the output fluctuation value is larger than the standard difference B at least in one cylinder, it can be judged that an abnormality has been arisen under a condition of existence of the outside EGR. As stated above, the standard difference B is a value determined based on the map as an output difference arising between a case in which no exhaust gas is flown back and a case in which predetermined quantity of exhaust gas is flown back. Thus, according to such a judgment, it is possible to execute an abnormality judgment of the external EGR apparatus 18 using a standard value of the output difference as criteria.

When the judgment is affirmed in the above described step 420, then, it is determined whether knocking is occurred in the presence of outside EGR (step 430). In the present embodiment, the internal combustion engine 12 is equipped with KCS (a knock control system). Further, the KCS is provided with a knocking sensor whose illustration is omitted. Occurrence or non-occurrence of knocking is judged based on the signal detected by this knocking sensor in the present step 430. When occurrence of knocking is determined as a result of step 430, it is judged whether a retard angle quantity due to an ignition timing retard angle control by the KCS is equal to or lower than the maximum retard angle quantity E (step 440). When the judgment of step 440 is affirmed, the ignition timing is retarded until occurrence of knocking is prevented within a range in which the retard angle quantity does not exceed the maximum retard angle quantity E (step 450). On the other hand, when the judgment of step 440 is denied, that is, when the retard angle quantity has already reached the maximum retard angle quantity E, the external EGR flow quantity is decreased (step 460). In this case, it is decided to cut the external EGR flow quantity according to the present embodiment.

When judgment is made that knocking is not produced in the presence of the outside EGR as a result of the above described step 430, it is determined, then, whether the output fluctuation values of all cylinders of the internal combustion engine 12 have shifted similarly (step 470). It is be noted that the judgment of the above described step 430 is executed for determining whether output fluctuation value of the internal combustion engine 12 due to knocking is occurred or not. When the judgment of step 430 is affirmed, the case in which an output fluctuation value due to knocking is occurred is excluded from subjects of judgment in procedure after step 430. Thus, in step 470, it is possible to limit the subject of judgment only to the output fluctuation value due to fluctuation of the external EGR flow amount.

In step 470, similar to the above described step 250 in FIG. 3, deviation Xi (i shows cylinder numbering) of the output fluctuation value is calculated. Then, mean value $\mu$ of the calculated deviations Xi of the output fluctuation value is calculated so as to calculate values by subtracting the mean value $\mu$ from every one of the deviations Xi. When the values calculated by subtracting the mean value $\mu$ from the deviations Xi are within a regulation range for all cylinders, judgment is made that the output fluctuation values of all cylinders of the internal combustion engine 12 have shifted similarly.

When the judgment of step 470 is affirmed, judgment is made that an abnormality (for example, fixation of the valve by carbon deposit) occurs in the common outside EGR stem passage (for example, common EGR valve 20) which affects the exhaust gas flow quantity flowing back to all cylinders (step 480).

On the other hand, when judgment is made in step 470 that the output fluctuation values for all cylinders of the internal combustion engine 12 have not shifted similarly, it is, then, determined whether they have shifted bank by bank (step 490). Concretely, likely to the above described step 270, procedure for judging whether the value obtained by subtracting the mean value $\mu$ from the deviation Xi is within the regulation range or not is executed for every bank. For example, first cylinder #1, third cylinder #3, and fifth cylinder #5 are assumed to be a first bank, while second cylinder #2, fourth cylinder #4, and sixth cylinder #6 are assumed to be a second bank. As for the first bank, it is determined whether a value obtained by subtracting a mean value $\mu 1$ ($\mu 1$: mean value of deviation of the output fluctuation value of the first bank) from the deviation Xi (i=1, 3, 5) is within the regulation range. Similarly, as for the second bank, it is determined whether a value obtained by subtracting a mean value $\mu 2$ ($\mu 2$: mean value of deviation of the output fluctuation value of the second bank) from the deviation Xi (i=2, 4, 6) is within the regulation range. When judgment is made that the value obtained by subtracting the mean value $\mu$ from the deviation Xi is within the regulation range as for both the first bank and the second bank, it is determined that the output fluctuation values of the internal combustion engine 12 have shifted bank by bank.

When the judgment of step 490 is affirmed, it is determined that the bank EGR valve 22 is fixated by carbon deposit or the collected portion of the EGR delivery pipes 28 is clogged up by carbon deposit (step 500).

On the other hand, when judgment is made in step 490 that the output fluctuation values of the internal combustion engine 12 have not shifted bank by bank, it is determined that the output fluctuation values have shifted cylinder by cylinder and an abnormality arises in the delivery pipe 28 for each cylinder (step 510). This abnormality may be, for example, a clogging of a delivery pipe 28 of a certain cylinder or the like due to carbon deposit and may reduce the external EGR flow quantity of the certain cylinder.

As described above, according to the control apparatus of the internal combustion engine of the present embodiment, the output fluctuation value that affects drivability is used as a judgment criterion for judging an abnormality of the external EGR apparatus. As a result, it is possible to assuredly determine an occurrence of an abnormality of the external EGR apparatus when the external EGR flow quantity varies so as to cause a problem in drivability. Further, it is determined whether the output fluctuation values have shifted similarly in all cylinders, bank by bank, or cylinder by cylinder based on the deviation Xi of the output fluctuation value of every cylinder. Thus, a n abnormal portion of the external EGR apparatus 18 can be specified.

Description is made of the present embodiment of the present invention so far, but the present invention is not limited to the above described embodiment, being possible to be transformed in various ways in the extent that it does not exceed the general meaning of the present invention. For example, it is transformed as follows to be carried out.

First Alternative

Although the present invention is applied to a Hybrid vehicle in the above described first embodiment, the application is not limited to this. It can be applied to a system in which driving wheels are driven only by driving force of an internal combustion engine 12 as long as it is possible to calculate the output value of every cylinder of the internal combustion engine 12.

Second Alternative

In the above described first embodiment, the output value occurring at the timing of ignition of each cylinder is calculated based on an output signal of the crank angle sensor 30. However, the configuration which can be applied to the present invention is not limited to this. In a case where the present invention is applied to an engine in which every cylinder is equipped with a combustion pressure sensor, the output value as for each cylinder may be detected based on the output signals of the combustion pressure sensor. In this case, it is also possible to know fluctuation of output value of each cylinder based on the peak value of the combustion pressure sensor.

Third Alternative

In the above described first embodiment, the output difference (the real measurement difference A and the standard difference B) between those of a case where no exhaust gas is flown back through the external EGR apparatus 18 and of a case where the predetermined flow quantity is flown back is used as a criterion for executing the procedure for judging whether the external EGR flow quantity is proper. According to this, abnormality occurring under a situation in which the external EGR flow quantity is zero can be detected. In other words, it is possible to specify an abnormality occurring other than the external EGR apparatus 18. However, the configuration which can apply to the present invention is not limited to this. The real measurement difference A and the standard difference B may be determined based on an output difference between those of a case where a predetermined flow quantity of exhaust gas is flown back through the external EGR apparatus 18 and of a case where another predetermined flow quantity which is difference from the above described predetermined quantity is flown back.

Fourth Alternative

In the above described first embodiment, it is determined in step 150 whether the absolute value of the difference between the real measurement difference A and the standard difference B is equal to or smaller than the threshold value C so as to judge whether the external EGR flow quantity is appropriate or not. However, the configuration which can apply to the present invention is not limited to this. Judgment can be made whether a value obtained by subtracting the standard difference B from the real measurement difference A is larger than the threshold value C after execution of step 140. Further, judgment can be made whether a value obtained by subtracting the real measurement difference A from the standard difference B is larger than the threshold value C after execution of step 140. In a case where such a judgment way is executed, the threshold value C used as a criterion for judging whether the external EGR flow quantity is overmuch or not and the threshold value C used as a criterion for judging whether the external EGR flow quantity is insufficient or not may be different value. It becomes possible to execute an overmuch or insufficient judgment of the external EGR flow quantity with deeper consideration of drivability by setting optimal values as the threshold values which are different from each other, respectively, for a case where the external EGR flow quantity is overmuch and for a case where it is insufficient.

Fifth Alternative

In the above described first embodiment, it is determined in step 150 whether the absolute value of the difference between the real measurement difference A and the standard difference B is equal to or smaller than the threshold value C so as to judge whether the external EGR flow quantity is appropriate or not. However, the configuration which can apply to the present invention is not limited to this. Judgment can be made whether the real measurement difference A is larger than a value obtained by adding the standard difference B to the threshold value C after execution of step 140.

Sixth Alternative

In the above described first embodiment, the abnormal judgment of the EGR system is executed while using the standard difference and the threshold value C, which are constant values. However, the configuration which can apply to the present invention is not limited to this. The standard difference B may take a variety of aspects such as constant values, functions of operation condition of the engine, or the like. Further, the threshold C may also be set to be a predetermined proportion of the standard difference B.

Seventh Alternative

In the above described first embodiment, the exhaust gas recirculation passage is connected to the intake branch pipe 26 which is led to each cylinder. However, the configuration which can apply to the present invention is not limited to this. That is, the present invention may be applied to a configuration in which the exhaust gas recirculation passage is directly connected to the surge tank 24 which is commonly provided for the both banks.

Eighth Alternative

In the above described first embodiment, the present invention is applied to the internal combustion engine 12 which is provided with the bank EGR valves 22 as shown in FIG. 1. However, the configuration which can apply to the present invention is not limited to this; the present invention can be applied to an internal combustion engine which is provided with no bank EGR valve but only a common EGR valve.

Ninth Alternative

Although the internal combustion engine 12 is of a V type in the above described first embodiment, it is not limited to this, and may be a straight type. In a case where it is of a straight type, output fluctuation of bank by bank does not occur. In this case, therefore, it can be determined immediately that the output fluctuation values have shifted cylinder by cylinder when judgment is made that the output fluctuation values of all cylinders have not similarly shifted. Further, although the internal combustion engine 12 has six cylinders in the above described first embodiment, it is not limited to this. The engine may has, for example, four cylinders.

Second Embodiment

Figure 5:
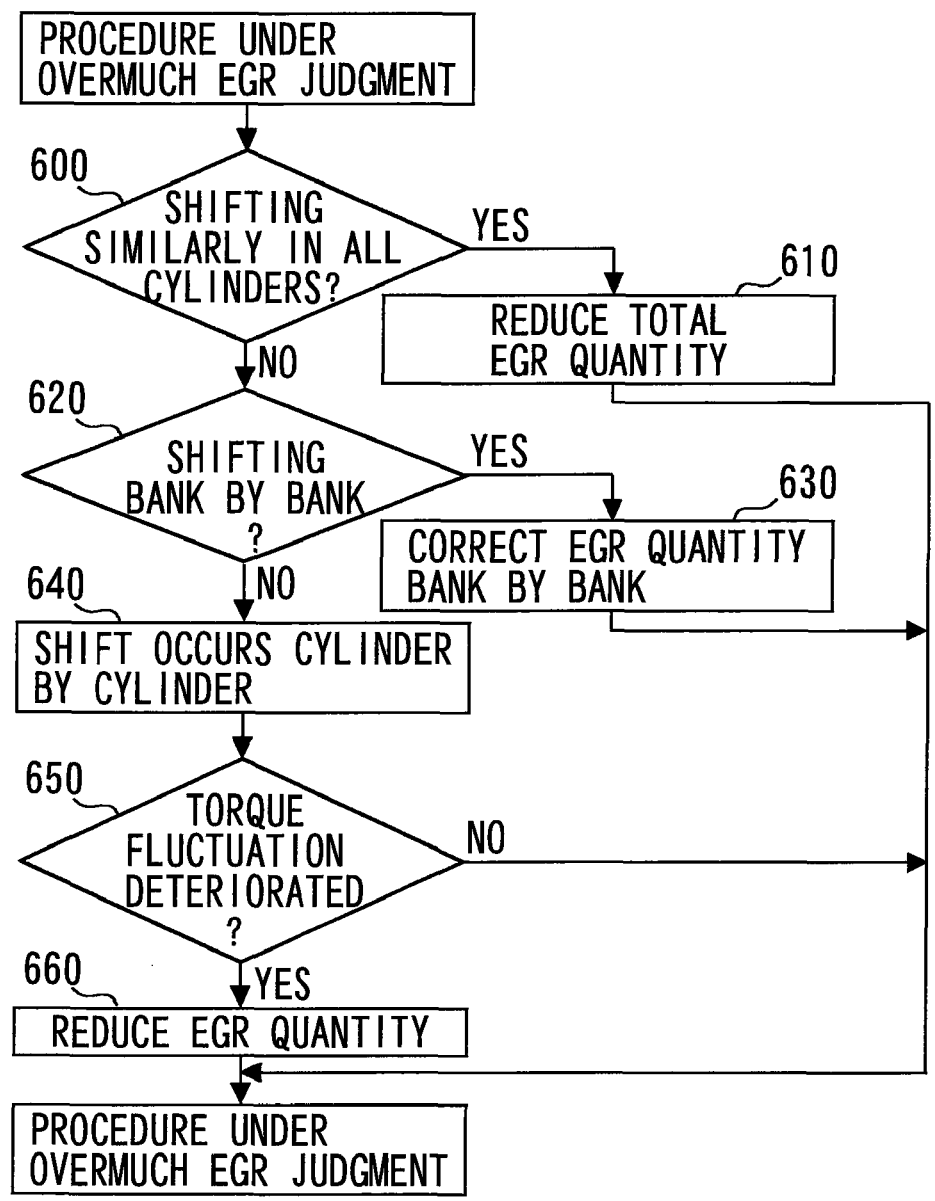
FIG. 5 is a flowchart showing steps executed when the external EGR flow quantity is overmuch for correcting the external EGR flow quantity.

As described above, it is determined whether the output fluctuations have shifted similarly for all cylinders, bank by bank, or cylinder by cylinder during the judgment procedure of an abnormal portion of the external EGR apparatus 18 in the first embodiment. In the present second embodiment, the external EGR flow quantity is corrected after the judgment of the shifting pattern of the output fluctuation values. FIG. 5 is a flowchart showing steps executed when the external EGR flow quantity is overmuch for correcting the external EGR flow quantity. FIG. 5 shows a concrete processing method representing how the external EGR flow quantity is corrected according to the every shifting pattern of the output fluctuation values.

According to the routine shown in FIG. 5, it is determined whether the output fluctuation values of all cylinders have shifted similarly, at first (step 600). Step 600 accords with the procedure for judging an abnormality portion of the external EGR apparatus 18 in step 250 shown in FIG. 3. When it is determined as a result of the judgment of step 600 that the output fluctuation values of all cylinders have shifted similarly, the total quantity of the external EGR flow quantity is reduced. Concretely, the opening angle of the common EGR valve 20 is turned small. By this, the output value of all cylinders comes closer to the target output value.

On the other hand, when it is determined as a result of the judgment of step 600 that the output fluctuation values of all cylinders have not similarly shifted, judgment is made to know whether they have shifted bank by bank (step 620). Step 620 accords with the procedure for judging an abnormality portion of the external EGR apparatus 18 in step 270 shown in FIG. 3. When it is determined as a result of the judgment of step 620 that the output fluctuation values have shifted bank by bank, one of followings is reduced: the external EGR flow quantity of the above described first bank; the external EGR flow quantity of the above described second bank; and the external EGR flow quantities of the first bank and the second bank (step 630). Concretely, the opening angle(s) of the bank EGR valve(s) 22 is (are) turned small. The bank(s) in which the external EGR flow quantity should be reduced may be determined based on a comparison between the output value at an ignition timing on a certain cylinder calculated in the above described step 220 in FIG. 3 and the target output value which is set beforehand. For example, if the output value at the ignition timing of first cylinder #1 is remarkably smaller than the target output value and the output value at the ignition timing of second cylinder #2 is approximately equal with the target output value, the external EGR flow quantity of the first bank should be reduced. However, if knocking occurs by reducing the external EGR flow quantity, it is desirable to stop the reduction of the external EGR flow quantity. According to the above-mentioned procedure, the output value of a bank which is determined to have an abnormality comes closer to the target output value.

When it is determined as a result of the judgment of step 620 that the output fluctuation values have not shifted bank by bank, judgment is made that the output fluctuation values have shifted cylinder by cylinder (step 640). The internal combustion engine 12 according to the present embodiment can not control the external EGR flow quantity on cylinder by cylinder basis because of its configuration, in a case where the output fluctuation values have shifted cylinder by cylinder. In this case, it is determined whether the torque fluctuation of the cylinder in which the occurrence of the output fluctuation is presumed is deteriorated with an extent greater than an allowable range (step 650). Concretely, the cylinder in which abnormal output fluctuation occurs is specified at first based on the output fluctuation value of every cylinder obtained by step 220 discussed above. Then, it is determined whether the output fluctuation value of the cylinder is equal to or more than a regulation value. As a result, if it is determined that the output fluctuation has been deteriorated as for the present cylinder, the total quantity of the external EGR flow quantity is reduced until a degree by which the problem on drivability does not arise (step 660). On the other hand, when the judgment of step 650 is denied, the external EGR flow quantity is subjected to no adjustment based on a judgment that no problem on drivability has occurred. Further, in a case where it has been determined that the output fluctuation values have shifted cylinder by cylinder, the ignition timing of the cylinder specified to be one in which overmuch external EGR flow quantity occurs may be advanced.

Figure 6A:
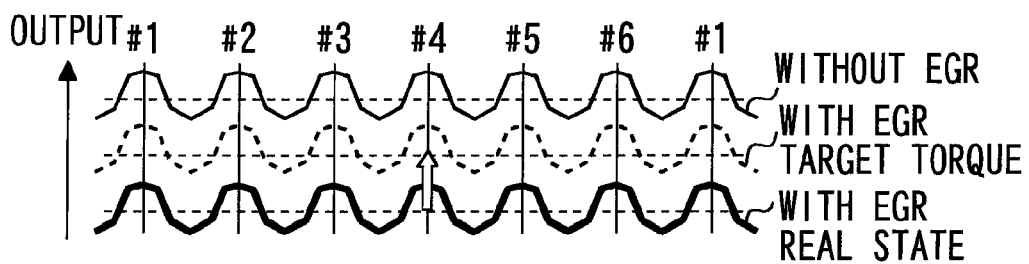
FIGS. 6(a) to 6 (c) are drawings showing outlines of output fluctuation values of each individual cylinder emerging when the external EGR flow quantity is overmuch.
Figure 6B:
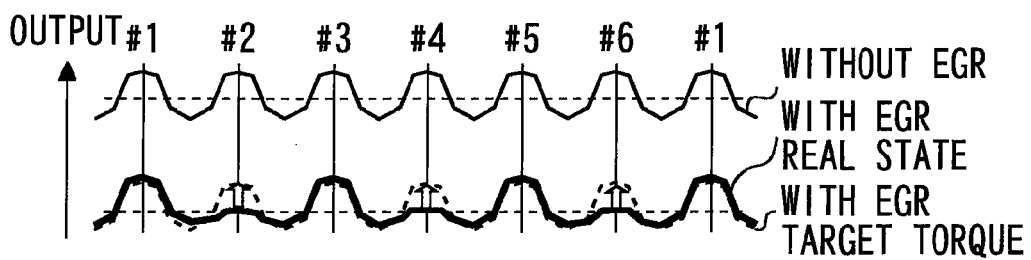
Figure 6C:
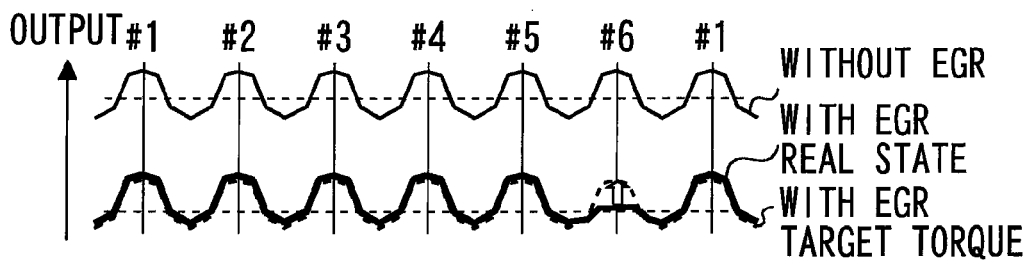

FIGS. 6(a) to 6(c) are drawings showing outlines of output fluctuation values of each individual cylinder emerging when the external EGR flow quantity is overmuch. The vertical scales show output values of every cylinder. Further, the thin solid line in the charts represent output values under a case in which the external EGR flow quantity is zero; the bold solid lines represent output values under a case in which a predetermined quantity of external EGR flows; and the broken lines represent target values of the output value under a case in which the predetermined quantity of external EGR flows.

FIG. 6(a) represents a case in which the output fluctuation values of all cylinders have shifted similarly. In this case, the total quantity of the outside EGR quantity is reduced, as stated in step 610 shown in FIG. 5. According to this, the output values of all cylinders come closer to the target output value, as shown in FIG. 6(a) by the arrow.

FIG. 6(b) represents a case in which the output fluctuation values have shifted bank by bank. In this case, the outside EGR quantity of the bank in which the external EGR flow quantity becomes overmuch is reduced as stated in step 630 in FIG. 5. As a result, the output value of the bank in which an abnormality has occurred comes closer to the target output value as shown by the arrow in FIG. 6(b).

FIG. 6(c) represents a case in which the output fluctuations have shifted cylinder by cylinder. In FIG. 6(c), the external EGR flow quantity in sixth cylinder #6 becomes excessive. In this case, the total quantity of the external EGR flow quantity is reduced within a degree by which knocking does not occur thereby no problem on drivability arises. Alternatively, the ignition timing of sixth cylinder #6 is solely advanced. In FIG. 6(c), the ignition timing of sixth cylinder #6 is advanced, whereby the output values of all cylinders come closer to the target output value.

Figure 7:
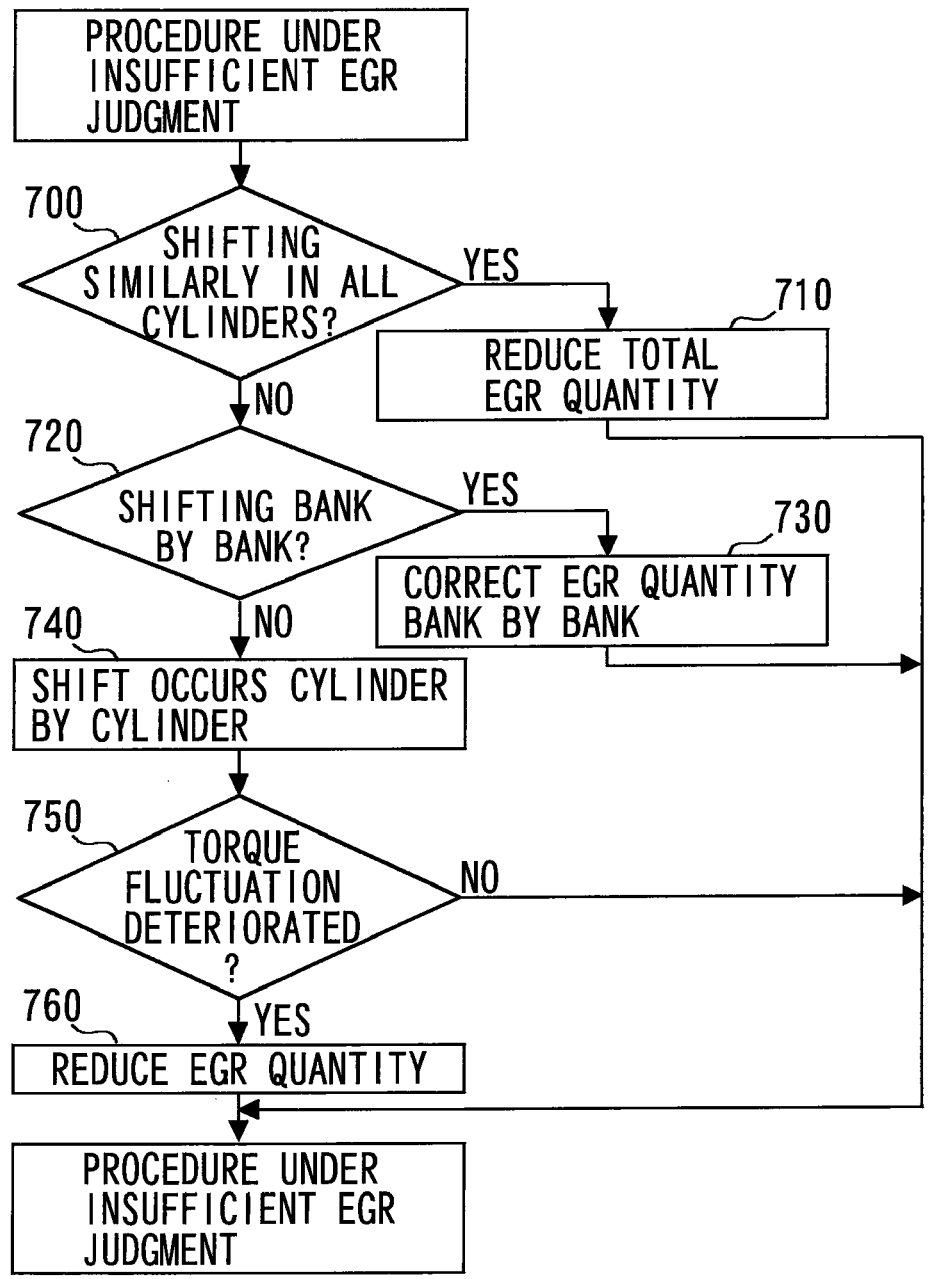
FIG. 7 is a flowchart showing steps executed when the external EGR flow quantity is insufficient for correcting the external EGR flow quantity.

FIG. 7 is a flowchart showing steps executed when the external EGR flow quantity is insufficient for correcting the external EGR flow quantity. As described above, the procedure for judging an abnormal portion of the external EGR apparatus 18 shown in FIG. 4 determines whether the output fluctuation values of the internal combustion engine 12 have shifted similarly in all cylinders, bank by bank, or cylinder by cylinder. FIG. 7 shows a concrete processing method representing how the external EGR flow quantity is corrected according to the every shifting pattern of the output fluctuation values.

According to the routine shown in FIG. 7, it is determined whether the output fluctuation values of all cylinders have shifted similarly, at first (step 700). Step 700 accords with the procedure for judging an abnormality portion of the external EGR apparatus 18 in step 470 shown in FIG. 4. When it is determined as a result of the judgment of step 700 that the output fluctuation values of all cylinders have shifted similarly, the total quantity of the external EGR flow quantity is reduced. By this, the output value of all cylinders comes closer to the target output value.

On the other hand, when it is determined as a result of the judgment of step 600 that the output fluctuation values of all cylinders have not similarly shifted, judgment is made to know whether they have shifted bank by bank (step 720). Step 720 accords with the procedure for judging an abnormality portion of the external EGR apparatus 18 in step 490 shown in FIG. 4. When it is determined as a result of the judgment of step 720 that the output fluctuation values have shifted bank by bank, one of followings is increased: the external EGR flow quantity of the above described first bank; the external EGR flow quantity of the above described second bank; and the external EGR flow quantities of the first bank and the second bank (step 630). The bank(s) in which the external EGR flow quantity should be increased may be determined based on a comparison between the output value at an ignition timing on a certain cylinder calculated in the above described step 420 in FIG. 4 and the target output value which is set beforehand. For example, if the output value at the ignition timing of first cylinder #1 is remarkably larger than the target output value and the output value at the ignition timing of second cylinder #2 is approximately equal with the target output value, the external EGR flow quantity of the first bank should be increased. According to the above-mentioned procedure, the output value of a bank in which an abnormality has occurred comes closer to the target output value.

When it is determined as a result of the judgment of step 720 that the output fluctuation values have not shifted bank by bank, judgment is made that the output fluctuation values have shifted cylinder by cylinder (step 740). The internal combustion engine 12 according to the present embodiment can not control the external EGR flow quantity on cylinder by cylinder basis because of its configuration, in a case where the output fluctuation values have shifted cylinder by cylinder. In this case, it is determined whether the torque fluctuation of the cylinder in which the occurrence of the output fluctuation is presumed is deteriorated with an extent greater than an allowable range (step 750). Concretely, the cylinder in which abnormal output fluctuation occurs is specified at first based on the output fluctuation value of every cylinder obtained by step 420 discussed above. Then, it is determined whether the output fluctuation value of the cylinder is equal to or more than a regulation value. As a result of step 750, if it is determined that the output fluctuation has been deteriorated, the total quantity of the external EGR flow quantity is reduced until a degree by which the problem on drivability does not arise (step 760). On the other hand, when the judgment of step 750 is denied, the external EGR flow quantity is subjected to no adjustment based on a judgment that no problem on drivability has occurred. Further, in a case where it has been determined that the output fluctuation values have shifted cylinder by cylinder, the ignition timing of the cylinder specified to be one in which overmuch external EGR flow quantity occurs may be advanced.

Figure 8A:
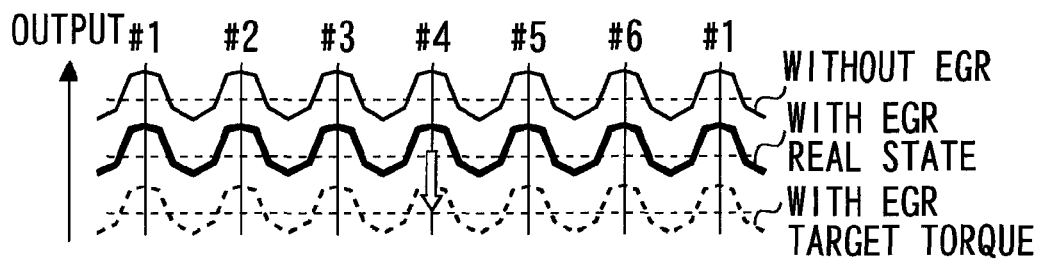
FIGS. 8(a) to 8(c) are drawings showing outlines of output fluctuation values of each individual cylinder emerging when the external EGR flow quantity is insufficient.

FIGS. 8(a) to 8 (c) are drawings showing outlines of output fluctuation values of each individual cylinder emerging when the external EGR flow quantity is insufficient. The vertical scales show output values of every cylinder. Further, the thin solid line in the charts represent output values under a case in which the external EGR flow quantity is zero; the bold solid lines represent output values under a case in which a predetermined quantity of outside EGR flows; and the broken lines represent target values of the output value under a case in which the predetermined quantity of external EGR flows.

FIG. 8(a) represents a case in which the output fluctuation values of all cylinders have shifted similarly. In this case, the total quantity of the outside EGR quantity is increased, as stated in step 710 shown in FIG. 7. According to this, the output values of all cylinders come closer to the target output value, as shown in FIG. 8(a) by the arrow.

Figure 8B:
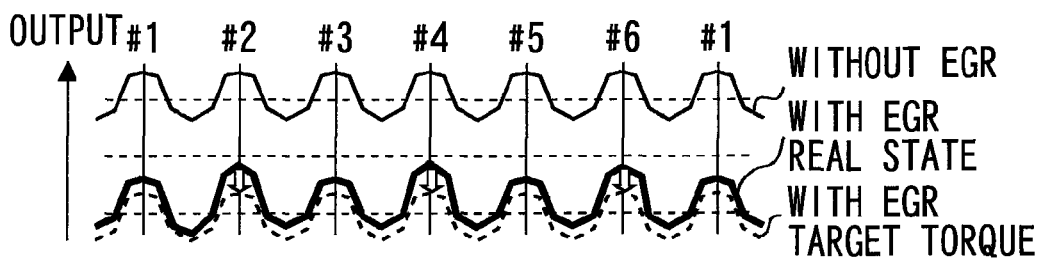

FIG. 8(b) represents a case in which the output fluctuation values have shifted bank by bank. In this case, the outside EGR quantity of the bank in which the external EGR flow quantity becomes insufficient is increased as stated in step 730 in FIG. 7. As a result, the output value of the bank in which an abnormality has occurred comes closer to the target output value as shown by the arrow in FIG. 8 (b).

Figure 8C:
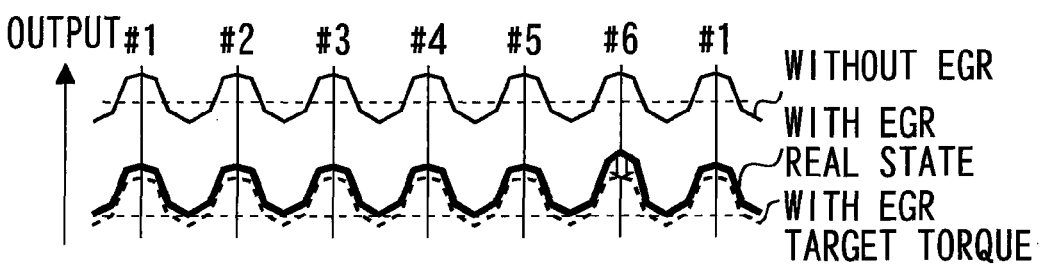

FIG. 8 (c) represents a case in which the output fluctuations have shifted cylinder by cylinder. In FIG. 8 (c), the external EGR flow quantity in sixth cylinder #6 becomes insufficient. In this case, the total quantity of the external EGR flow quantity is reduced. As a result, the output values of the cylinders other than sixth cylinder #6 increase, thereby the output differences among the cylinders are diminished. Therefore the output fluctuation of the internal combustion engine 12 is suppressed. Alternatively, in this case, the ignition timing of sixth cylinder #6 may be solely retarded. In FIG. 8(c), the ignition timing of sixth cylinder #6 is retarded, whereby the output values of all cylinders come closer to the target output value.

In the present embodiment, procedure for correcting the external EGR flow quantity is executed, after the judgment of overmuch or insufficient of the external EGR flow quantity which is flown back through the external EGR apparatus 18 followed by the identification of an abnormal portion. In a case where the correction quantity due to the correcting procedure of the external EGR flow quantity discussed above exceeds the regulation value, a problem on the outside EGR control, such as deterioration of fuel consumption or the like, may arise. Thus, when the correction quantity by the correcting procedure of the external EGR flow quantity discussed above exceeds the regulation value, the system may promote the driver to have a maintenance check by illuminating a MIL (Malfunction Indicator Lamp).

Third Embodiment

Figure 9:
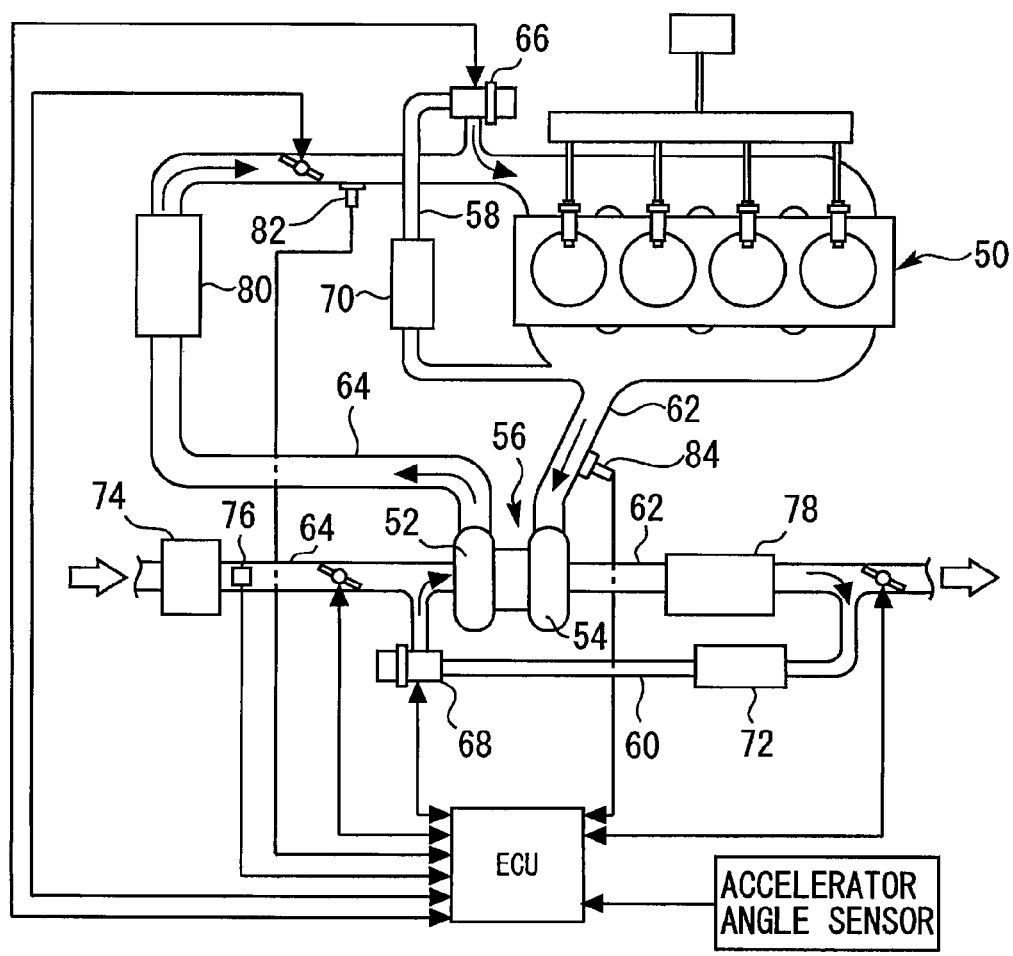
FIG. 9 is a diagram showing a system configuration of an internal combustion engine according to a third embodiment of the present invention.

FIG. 9 is a diagram showing a system configuration of an internal combustion engine according to a third embodiment of the present invention. As shown in FIG. 9, the internal combustion engine 50 of the present embodiment is provided with a supercharger 56 including a compressor 52 and a turbine 54. Further, the internal combustion engine 50 is provided with two systems of external EGR apparatus 58, 60.

One of them consists of a high pressure exhaust gas recirculation passage 58 (HPL: High Pressure Loop) which connects an upstream side of the exhaust passage 62 than the turbine 54 and a downstream side of the intake passage 64 than the compressor 52. The other consists of a low pressure exhaust gas recirculation passage 60 (LPL: Low Pressure Loop) which connects a downstream side of the exhaust passage 62 than the turbine 54 and an upstream side of the intake passage 64 than the compressor 52. The HPL 58 is connected to the intake passage 64 via a high pressure purpose EGR valve 66. The LPL 60 is connected to the intake passage 64 via a low pressure purpose EGR valve 68. An HPL-EGR cooler 70 for cooling high pressure EGR gas is provided to the HPL 70, whereas a LPL-EGR cooler 72 for cooling low pressure EGR gas is provided to the HPL 70. The internal combustion engine has an air-cleaner 74 and an airflow meter 76 in the intake passage 64 and exhaust gas purifier 78 in the exhaust passage 62. In the intake passage 64, an intercooler 80 is provided at downstream of the compressor 52 for cooling compressed air. An intake pressure sensor 82 and an exhaust pressure sensor 84 are provided to the intake passage 64 and the exhaust passage 62, respectively.

In first embodiment, the output value of the internal combustion engine 12 under a condition of no external EGR flow quantity is calculated in step 110 during the procedure for judging whether the external EGR flow quantity is proper, which is shown in FIG. 2. Further, the output value under a condition in which a predetermined quantity of outside EGR is flown back is calculated in step 120. In the present third embodiment, the output value is calculated in step 110 under a condition in which exhaust gas is flown back only through the high pressure exhaust gas recirculation passage 58. In addition, the output value is calculated in step 120 under a condition in which exhaust gas is flown back through both the high pressure exhaust gas recirculation passage 58 and the low pressure exhaust gas recirculation passage 60. Then, the same procedures as those in first embodiment are executed in steps after step 120. In this case, if the condition of step 150 is satisfied, it is found that both of the high pressure exhaust gas recirculation passage 58 and the low pressure exhaust gas recirculation passage 60 are normal. On the other hand, when the condition of step 150 is denied and the condition of step 170 is satisfied, it can be determined that excessive output difference has occurred due to the effect of the low pressure exhaust gas recirculation passage 60. In this case, judgment can be made that the external EGR flow quantity flown back through the low pressure exhaust gas recirculation passage 60 is overmuch. On the other hand, when the condition of step 170 is denied, judgment can be made that the external EGR flow quantity flowed back through the low pressure exhaust gas recirculation passage 60 is insufficient.

According to the present third embodiment, as described above, it is possible to differently detect the following states: both the high pressure exhaust gas recirculation passage 58 and the low pressure exhaust gas recirculation passage 60 are normal; the flow quantity of the external EGR flown back through the low pressure exhaust gas recirculation passage 60 is overmuch; and the flow quantity of the external EGR flown back through the low pressure exhaust gas recirculation passage 60 is insufficient. Although the output value under a condition in which exhaust gas is flown back only through the high pressure exhaust gas recirculation passage 58 is calculated in step 110 in the present embodiment 3, the present invention is not limited to this. In step 110, the output value under a condition in which exhaust gas is flown back only through the low pressure exhaust gas recirculation passage 60 may be calculated. In this case, it is possible to differently detect the following states: both the high pressure exhaust gas recirculation passage 58 and the low pressure exhaust gas recirculation passage 60 are normal; the flow quantity of the outside EGR flown back through the high pressure exhaust gas recirculation passage 58 is overmuch; and the flow quantity of the outside EGR flown back through the high pressure exhaust gas recirculation passage 58 is insufficient.

DESCRIPTION OF REFERENCE NUMERALS

10 Driving Systems
12, 50 Internal Combustion Engines
14 Motor
16 ECU
18 External EGR Apparatus
20 Common EGR Valve
22 Bank EGR Valve
24 Surge Tanks
26 Intake Branch Pipe
28 Delivery Pipe
30 Crank Angle Sensor
52 Compressor
54 Turbine
56 Supercharger
58 High pressure Exhaust Gas Recirculation Passage
60 Low pressure Exhaust Gas Recirculation Passage
62 Exhaust Passage
64 Intake Passage

The invention claimed is:

1. A control apparatus of an internal combustion engine, comprising:
    an external EGR apparatus, including
        an exhaust gas recirculation passage that connects an exhaust passage and an intake passage of the internal combustion engine, and
        an EGR valve positioned in the exhaust gas recirculation passage;
    output value acquiring sensor that acquire a value related to an output of the internal combustion engine; and
        an electronic control unit having a non-transitory computer readable media stored executable instructions to perform procedures of:
        detecting an engine confirmation operation status in which fluctuation parts of outputs requested by a driving system are assisted by a driving force of a motor;
        detecting, based on the value acquired by said output value acquiring sensor, a first output value generated by said internal combustion engine with said EGR valve being adjusted so that a first EGR flow quantity is flown back, under said engine confirmation operation status,
        detecting, based on the value acquired by said output value acquiring sensor, a second output value generated by said internal combustion engine with said EGR valve being adjusted so that a second EGR flow quantity is flown back, under said engine confirmation operation status, and
        determining an EGR abnormality by judging an occurrence of an abnormality in said external EGR apparatus according to a predetermined criterion based on a difference between said first output value and said second output value, and
        actuating said EGR valve to obtain a desired external EGR flow quantity flowing back into said intake passage from said exhaust passage through said exhaust gas recirculation passage.

2. The control apparatus of said internal combustion engine according to claim 1, wherein
    a standard difference value and a predetermined threshold value are stored in said electric control unit, and
    said procedure for determining an EGR abnormality further comprises:
    calculating the difference between said first output value detected and said second output value detected as an actual measurement difference value, and
    judging an occurrence of an abnormality in said external EGR apparatus based on a comparison result of said actual measurement difference value, said standard difference value, and said predetermined threshold value.

3. The control apparatus of said internal combustion engine according to claim 2, wherein said EGR abnormality judgment procedure judges the occurrence of an abnormality in said external EGR apparatus when an absolute value of the difference between said actual measurement difference value and said standard difference value is bigger than said predetermined threshold value.

4. The control apparatus of said internal combustion engine according to claim 2, wherein said EGR abnormality judgment procedure further includes a procedure of determining that the external EGR flow quantity is excessive to a normal amount when a value taken by subtracting said standard difference value from said actual measurement difference value is bigger than said predetermined threshold value.

5. The control apparatus of said internal combustion engine according to claim 4, wherein
    said electronic control unit has the non-transitory computer readable media stored executable instructions to further perform procedures of:
    judging whether a fluctuation of output of said internal combustion engine is smaller than said actual measurement difference value, under a condition where an external EGR flow quantity equal to the smaller one of said first EGR flow quantity and said second EGR flow quantity is flown back;
    judging whether the fluctuation of output of said internal combustion engine is larger than said predetermined threshold value, under a condition where an external EGR flow quantity equal to the larger one of said first EGR flow quantity and said second EGR flow quantity is flown back; and
    judging that said external EGR apparatus is out of order in a status in which the external EGR flow quantity is larger than a target value, when said EGR abnormality judgment procedure judges that the external EGR flow quantity is excessive and both said first judgment procedure and said second judgment procedure make affirmative judgments.

6. The control apparatus of said internal combustion engine according to claim 2, wherein said EGR abnormality judgment procedure further includes a procedure of determining that the external EGR flow quantity is insufficient to a normal amount when a value taken by subtracting said actual measurement difference value from said standard difference value is bigger than said predetermined threshold value.

7. The control apparatus of said internal combustion engine according to claim 6, wherein
    said electronic control unit has the non-transitory computer readable media stored executable instructions to further perform procedures of:
    judging whether a fluctuation of output of said internal combustion engine is larger than said standard difference value, under a condition where an external EGR flow quantity equal to the larger one of said first EGR flow quantity and said second EGR flow quantity is flown back; and judging that said external EGR apparatus is out of order in a status in which the external EGR flow quantity is smaller than a target value, when said EGR abnormality judgment procedure judges that the external EGR flow quantity is insufficient and both said first judgment procedure and said third judgment procedure make affirmative judgments.

8. The control apparatus of said internal combustion engine according to claim 1, further comprising:

a supercharger including a turbine and a compressor;

wherein said exhaust gas recirculation passage includes:

a high pressure exhaust gas recirculation passage connecting an upstream side of the exhaust passage with said turbine with a downstream side of the intake passage with said compressor; and a low pressure exhaust gas recirculation passage connecting a downstream side of the exhaust passage with said turbine with an upstream side of the intake passage with said compressor;

wherein said EGR valve includes:

a high pressure EGR valve installed to said high pressure exhaust gas recirculation passage; and a low pressure EGR valve installed to said low pressure exhaust gas recirculation passage;

wherein one of said first EGR flow quantity and said second EGR flow quantity is equal to an external EGR flow quantity produced when exhaust gas is flown back only through one of said high pressure exhaust gas recirculation passage and said low pressure exhaust gas recirculation passage, and the other is equal to an external EGR flow quantity produced when exhaust gas is flown back through both said high pressure exhaust gas recirculation passage and said low pressure exhaust gas recirculation passage.

* * * * *